(12) United States Patent
Diab et al.

(10) Patent No.: US 8,279,883 B2
(45) Date of Patent: Oct. 2, 2012

(54) HIGH SPEED ISOLATION INTERFACE FOR POE

(75) Inventors: Wael William Diab, San Francisco, CA (US); Asif Hussain, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 485 days.

(21) Appl. No.: 12/168,577

(22) Filed: Jul. 7, 2008

(65) Prior Publication Data
US 2010/0005322 A1 Jan. 7, 2010

(51) Int. Cl.
H04L 12/28 (2006.01)
(52) U.S. Cl. .......................... 370/410; 370/389
(58) Field of Classification Search ................. None
See application file for complete search history.

(56) References Cited

U.S. PATENT DOCUMENTS

| | | | |
|---|---|---|---|
| 3,949,334 A * | 4/1976 | Launt | 335/153 |
| 5,909,564 A * | 6/1999 | Alexander et al. | 710/316 |
| 7,560,825 B2 * | 7/2009 | Crawley | 307/1 |
| 2007/0263707 A1 * | 11/2007 | Theodoras, II | 375/220 |
| 2009/0273238 A1 * | 11/2009 | Apfel | 307/31 |

FOREIGN PATENT DOCUMENTS
WO   WO 2006/138713   * 12/2006

OTHER PUBLICATIONS

IEEE Std 802.3af™-2003, IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, The Institute of Electrical and Electronics Engineers, Inc. (Jun. 2003), pp. 1-121.

IEEE Std 802.3at™-2009, IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, The Institute of Electrical and Electronics Engineers, Inc. (Oct. 2009), pp. 1-123.

* cited by examiner

*Primary Examiner* — Robert Wilson
(74) *Attorney, Agent, or Firm* — Sterne, Kessler, Goldstein & Fox P.L.L.C.

(57) ABSTRACT

A high speed isolation interface which can be used to enable high speed communications between the isolated side and the wire side in a PoE system is provided. The high speed isolation interface may implement an Ethernet or non-Ethernet based signaling scheme. The high speed isolation interface can be used within both PSE (endspan or midspan) and PD systems, including single port and multi-port PSE and PD systems. Further, the high speed isolation interface is usable within pre-standard PoE, 802.3af PoE, and 802.3at PoE systems. The high speed isolation interface may also be used within 2-pair PoE (Alternative A) and 4-pair PoE (Alternative B) systems.

23 Claims, 9 Drawing Sheets

| start of a sequence pattern | control byte for Port 1 | control byte for Port 2 | • • • | control byte for Port n | start of a sequence pattern |

802

| start of a sequence pattern | status byte for Port 1 | status byte for Port 2 | • • • | status byte for Port n | start of a sequence pattern |

| start of a sequence pattern | Port Number X | control byte for Port X | • • • | Port Number Y | control byte for Port Y | start of a sequence pattern |

806

| start of a sequence pattern | Port Number X | status byte for Port X | • • • | Port Number Y | status byte for Port Y | start of a sequence pattern |

| start of a sequence pattern | Bytes for ports polled | Control byte for polled port X | • • • | Control byte for polled port Y | start of a sequence pattern |

810

| start of a sequence pattern | Bytes for reporting ports | Status byte for reporting port X | • • • | Status byte for reporting port Y | start of a sequence pattern |

HIGH SPEED ISOLATION INTERFACE FOR POE

BACKGROUND OF THE INVENTION

1. Field of the Invention

The present invention relates generally to Power over Ethernet (PoE), and more particularly to a high speed interface for use in PoE systems.

2. Background Art

Ethernet communications provide high speed communications between data terminals.

Power over Ethernet (PoE) systems enable power transmission over the same transmission lines that carry data in an Ethernet link. Generally, power is generated at a Power Source Equipment (PSE) side of the PoE system and is carried over an Ethernet cable to a Powered Device (PD) side of the PoE system.

A PSE system generally includes a transceiver physical layer device (transceiver/PHY) having full duplex transmit and receive capability. The PSE system further includes a PSE controller that controls the DC voltage supply to the PD. A PD system also includes a transceiver/PHY device in addition to a PD controller, which performs a number of functions at the PD side, including monitoring the voltage and current at the PD side of the PoE system.

Typically, in a PSE or a PD, the electronics side (also called the isolated side) is electrically isolated from the wire side (i.e., the side where power is inserted at the PSE and where power is received at the PD). As such, in a PSE, the transceiver/PHY device is electrically isolated from the PSE controller. Similarly, in a PD, the transceiver/PHY device is isolated from the PD controller.

However, there is a need to cross the isolation barrier in order to communicate between the isolated side and the wire side both in a PSE and a PD system. For example, in a PSE system, the transceiver/PHY device needs to communicate with the PSE controller in order to turn on/off the power, read statistics, and receive information regarding PoE classes discovered by the PSE controller, for example.

Conventional systems use opto-isolators to cross the isolation barrier between the isolated side and the wire side. To minimize cost, however, only a few opto-isolators are used to implement a serial communications interface (e.g., 2-wire or 3-wire) between the isolated side and the wire side. The result is a slow interface mainly due to the limited bandwidth (typically on the order of 100 Khz) of opto-isolators.

The inefficiency of using opto-isolators is further accentuated in large, high end enterprise PoE systems with hundreds of PoE ports, for example, in which there is even more demand for real time communication and control between the isolated side and the wire side.

There is a need therefore for PoE systems having enhanced interface capabilities between the isolated side and the wire side both at the PSE and the PD, to enable enhanced PoE applications.

BRIEF SUMMARY OF THE INVENTION

The present invention relates generally to Power over Ethernet (PoE), and more particularly to a high speed interface for use in Power Source Equipment (PSE) systems.

A high speed isolation interface which can be used to enable high speed communications between the isolated side and the wire side in a PoE system is provided. The high speed isolation interface may implement an Ethernet or non-Ethernet based signaling scheme. According to embodiments of the present invention, the high speed isolation interface can be used within both PSE (endspan or midspan) and PD systems, including single port and multi-port PSE and PD systems. Further, the high speed isolation interface is usable within pre-standard PoE, 802.3af PoE, and 802.3at PoE systems. The high speed isolation interface may also be used within 2-pair PoE (Alternative A) and 4-pair PoE (Alternative B) systems.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 8A-8C illustrate example signaling schemes usable in a non-Ethernet based high speed isolation interface according to an embodiment of the present invention.

The present invention will be described with reference to the accompanying drawings. Generally, the drawing in which an element first appears is typically indicated by the leftmost digit(s) in the corresponding reference number.

DETAILED DESCRIPTION OF EMBODIMENT(S)

Overview

Ethernet communications provide high speed communications between data terminals.

Power over Ethernet (PoE) systems enable power transmission over the same transmission lines that carry data in an Ethernet link. Generally, power is generated at a Power Source Equipment (PSE) side of the PoE system and is carried over an Ethernet cable to a Powered Device (PD) side of the PoE system.

A PSE system generally includes a transceiver physical layer device (transceiver/PHY) having full duplex transmit and receive capability. The PSE system further includes a PSE controller that controls the DC voltage supply to the PD. A PD system also includes a transceiver/PHY device in addition to a PD controller, which performs a number of functions at the PD side, including monitoring the voltage and current at the PD side of the PoE system.

Typically, in a PSE or a PD, the electronics side (also called the isolated side) is electrically isolated from the wire side (i.e., the side where power is inserted at the PSE and where power is received at the PD). As such, in a PSE, the transceiver/PHY device is electrically isolated from the PSE controller. Similarly, in a PD, the transceiver/PHY device is isolated from the PD controller.

However, there is a need to cross the isolation barrier in order to communicate between the isolated side and the wire both in a PSE and a PD system. For example, in a PSE system, the transceiver/PHY device needs to communicate with the PSE controller in order to turn on/off the power, read statistics, and receive information regarding PoE classes discovered by the PSE controller, for example.

Conventional systems use opto-isolators to cross the isolation barrier between the isolated side and the wire side. To minimize cost, however, only a few opto-isolators are used to implement a serial communications interface (e.g., 2-wire or 3-wire) between the isolated and the wire side. The result is a slow interface mainly due to the limited bandwidth (typically on the order of 100 Khz) of opto-isolators.

The inefficiency of using opto-isolators is further accentuated in large, high end enterprise PoE systems with hundreds of PoE ports, for example, in which there is even more demand for real time communication and control between the isolated side and the wire side.

There is a need therefore for PoE systems having enhanced interface capabilities between the isolated side and the wire side both at the PSE and the PD, to enable enhanced PoE applications.

Embodiments of the present invention provide a high speed isolation interface for use in PoE systems. The high speed isolation interface enables a serial communications interface between the isolated side and the wire side in a PoE system (e.g., PSE or PD). The high speed isolation interface may implement an Ethernet or non-Ethernet based signaling scheme. The high speed interface may be used in single port and multi-port PoE systems.

Introduction

Figure 1:
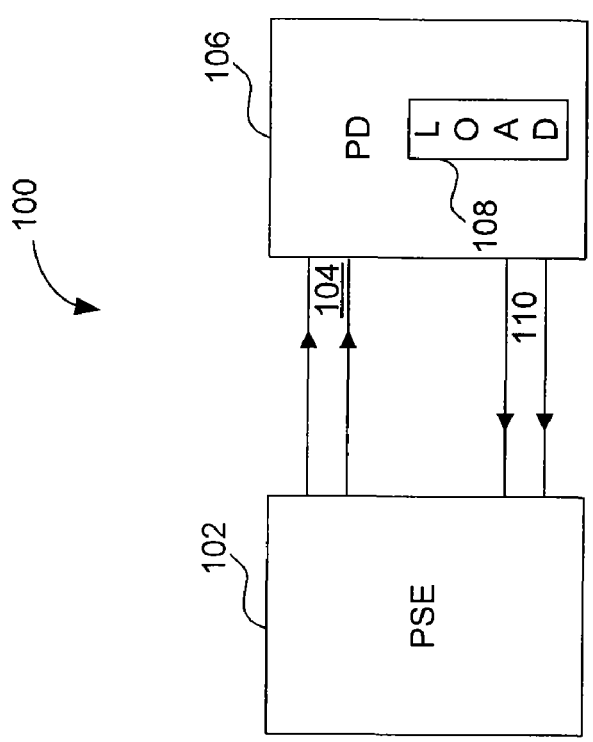
FIG. 1 is a block diagram of a conventional Power over Ethernet (PoE) system.

FIG. 1 illustrates a high level diagram of a conventional Power over Ethernet (PoE) system 100 that provides both DC power and data communications over a common data communications medium. Referring to FIG. 1, power source equipment 102 provides DC power over conductors 104, 110 to a powered device (PD) 106 having a representative electrical load 108. The PSE 102 and PD 106 also include data transceivers that operate according to a known communications standard, such as the IEEE Ethernet standard. More specifically, the PSE 102 includes a physical layer device on the PSE side that transmits and receives high speed data with a corresponding physical layer device in the PD 106, as will be discussed further below. Accordingly, the power transfer between the PSE 102 and the PD 106 occurs simultaneously with the exchange of high speed data over the conductors 104, 110. In one example, the PSE 102 is a data switch having multiple ports that is communication with one or more PD devices, such as Internet phones, or a wireless access point.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 10 Gigabit Ethernet. In 10/100 Ethernet, only two of the four pairs carry data communications, and the other two pairs of conductors are unused. Herein, conductor pairs may be referred to as Ethernet cables or communication links for ease of discussion.

Figure 2:
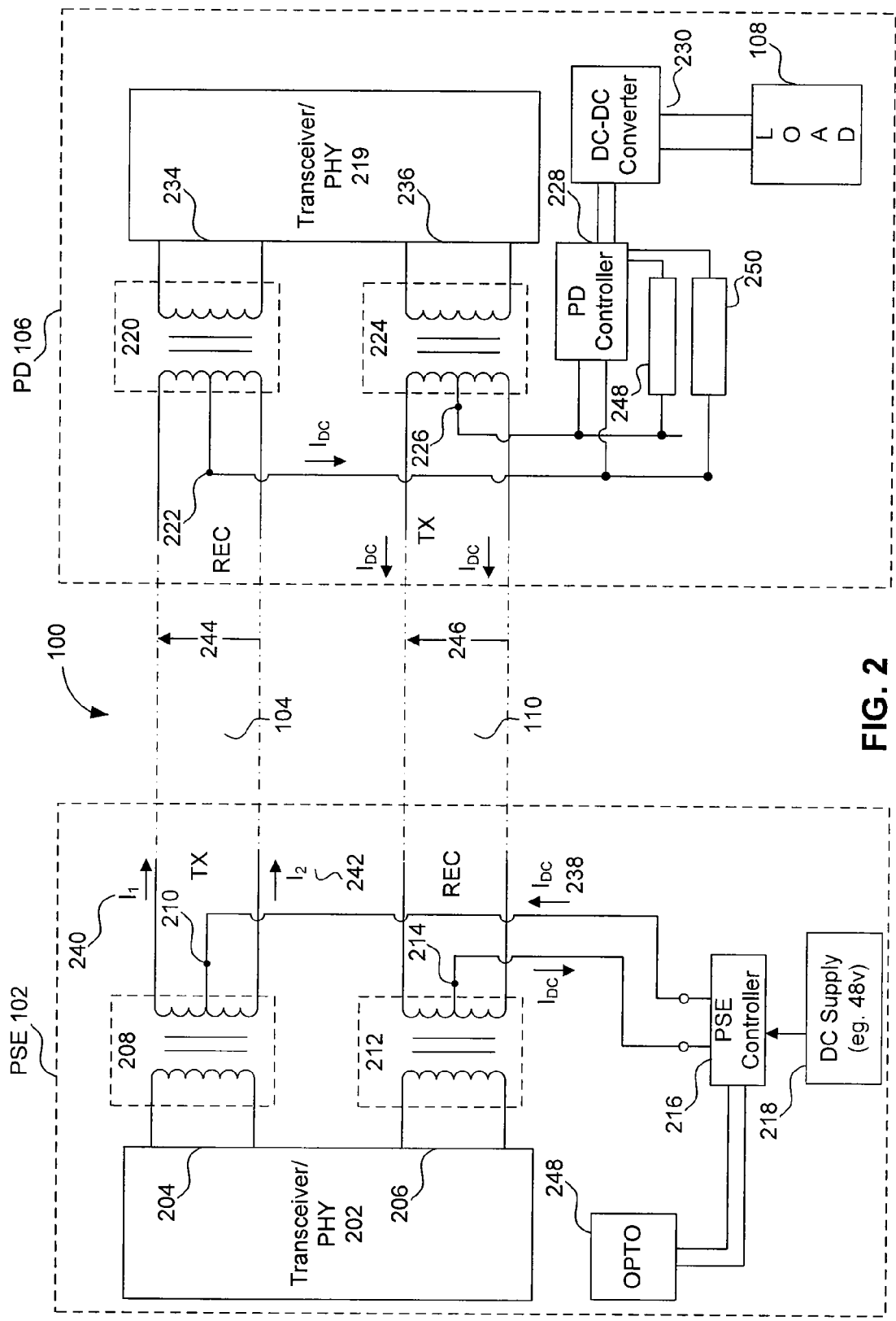
FIG. 2 illustrates a more detailed illustration of a conventional power PoE system.

FIG. 2 provides a more detailed circuit diagram of the PoE system 100, where PSE 102 provides DC power to PD 106 over conductor pairs 104 and 110. PSE 102 includes a transceiver physical layer device (or PHY) 202 having full duplex transmit and receive capability through differential transmit port 204 and differential receive port 206. (Herein, transceivers may be referred to as PHYs) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC voltage supply 216 generates an output voltage that is applied across the respective center taps of the transformers 208 and 210 on the conductor side of the transformers. The center tap 210 is connected to a first output of a DC voltage supply 216, and the center tap 214 is connected to a second output of the DC voltage supply 216. As such, the transformers 208 and 212 isolate the DC voltage from the DC supply 216 from the sensitive data ports 204, 206 of the transceiver 202. An example DC output voltage is 48 volts, but other voltages could be used depending on the voltage/power requirements of the PD 106.

The PSE 102 further includes a PSE controller 218 that controls the DC voltage supply 216 based on the dynamic needs of the PD 106. More specifically, the PSE controller 218 measures the voltage, current, and temperature of the outgoing and incoming DC supply lines so as to characterize the power requirements of the PD 106.

Further, the PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. IEEE has imposed standards on the detection, power classification, and monitoring of a PD by a PSE in the IEEE 802.3 standard, which is incorporated herein by reference.

Still referring to FIG. 2, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 106 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the third center tap 222 to reform the direct current ($I_{DC}$) 238 so as to power PD 106. On return, the direct current ($I_{DC}$) 238 flows from PD 106 through the fourth center tap 226, and divides for transport over conductor pair 110. The return DC current recombines at the second center tap 214, and returns to the DC power supply 216. As discussed above, data transmission between the PSE 102 and the PD 106 occurs simultaneously with the DC power supply described above. Accordingly, a first communication signal 244 and/or a second communication signal 246 are simultaneously differentially carried via the conductor pairs 104 and 110 between the PSE 102 and the PD 106. It is important to note that the communication signals 244 and 246 are differential signals that ideally are not effected by the DC power transfer.

High Speed Isolation Interface for PoE

As described above, conventional PoE systems use an opto-isolator or opto-coupler between the isolated side and the wire side of the system to enable a communications interface between the two sides and to provide the required electrical isolation.

Figure 3:
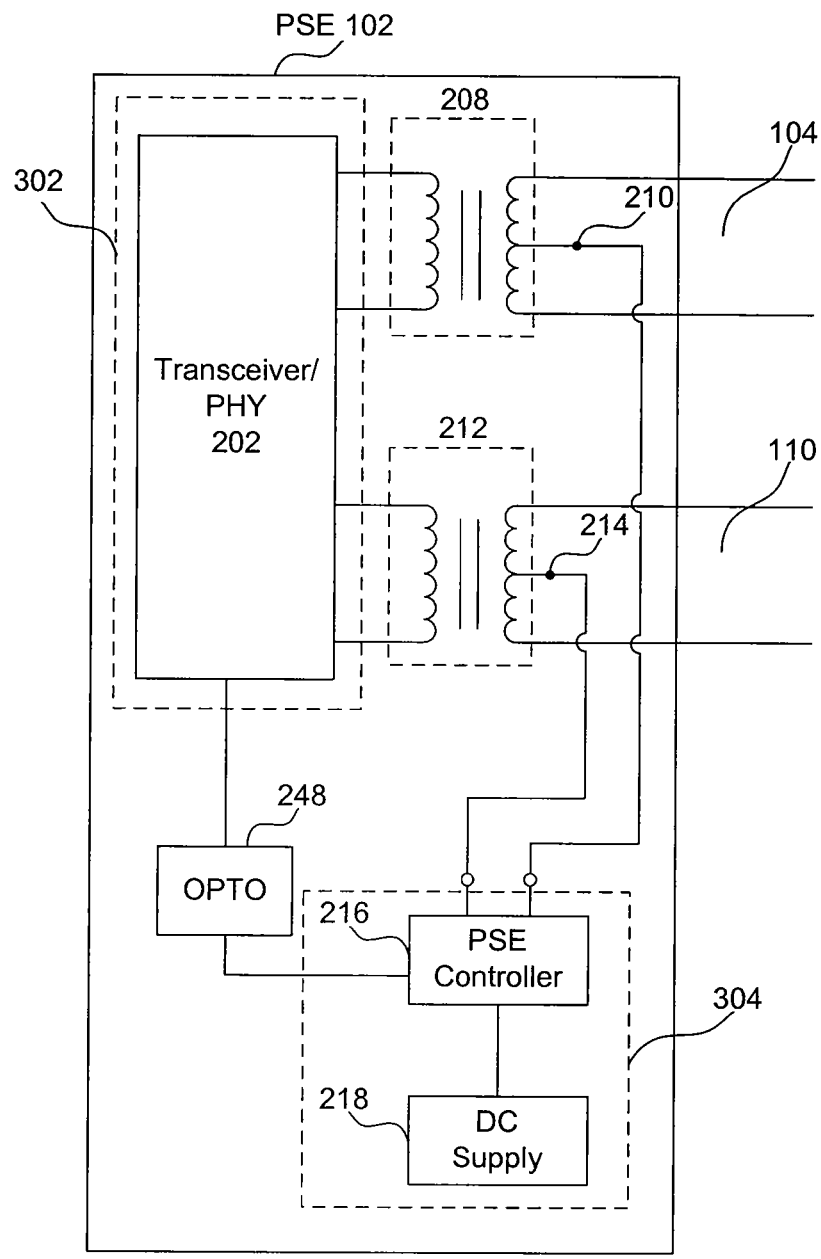
FIG. 3 illustrates an example power source equipment (PSE) having an opto-isolator interface.

FIG. 3 illustrates an example 300 of a conventional power source equipment (PSE) 102 having an opto-isolator interface between the isolated side 302 and the wire side 304 of the PSE.

As shown in FIG. 3, the isolated side 302 includes transceiver/PHY 202. The wire side 304 includes DC Supply 218 and PSE Controller 216. Opto-isolator 248 sits between the isolated side 302 and the wire side 304 to provide an isolation interface. For example, opto-isolator 248 may provide signal isolation, noise elimination, and voltage level conversion between the isolated side 302 and the wire side 304. Opto-isolator 248 may be a light emitting diode (LED), for example.

Typically, opto-isolator 248 enables a serial communications interface (e.g., 2-wire or 3-wire) between the isolated side 302 and the wire side 304. However, due to the limited bandwidth of opto-isolators (typically on the order of 100 KHz), the enabled interface is slow. Further, the cost of opto-isolators precludes having multiple opto-isolators to enable a faster parallel interface, for example.

As a result, an opto-isolator based isolation interface is not be suitable for large, high end enterprise PoE systems with hundreds of PoE ports, for example.

In the following, a high speed isolation interface which can be used to enable high speed communications between the isolated side and the wire side in a PoE system is presented. The high speed isolation interface may implement an Ethernet or non-Ethernet based signaling scheme. According to embodiments of the present invention, the high speed isolation interface can be used within both PSE (endspan or midspan) and PD systems, including single port and multi-port PSE and PD systems. Further, the high speed isolation interface is usable within pre-standard PoE, 802.3af PoE, and 802.3at PoE systems. The high speed isolation interface may also be used within 2-pair PoE (Alternative A) and 4-pair PoE (Alternative B) systems.

For ease of description, the high speed isolation interface will be described below in the context of a PSE system. However, as noted above, the high speed isolation interface is not limited to a PSE and can be similarly used in a PD system.

Figure 4:
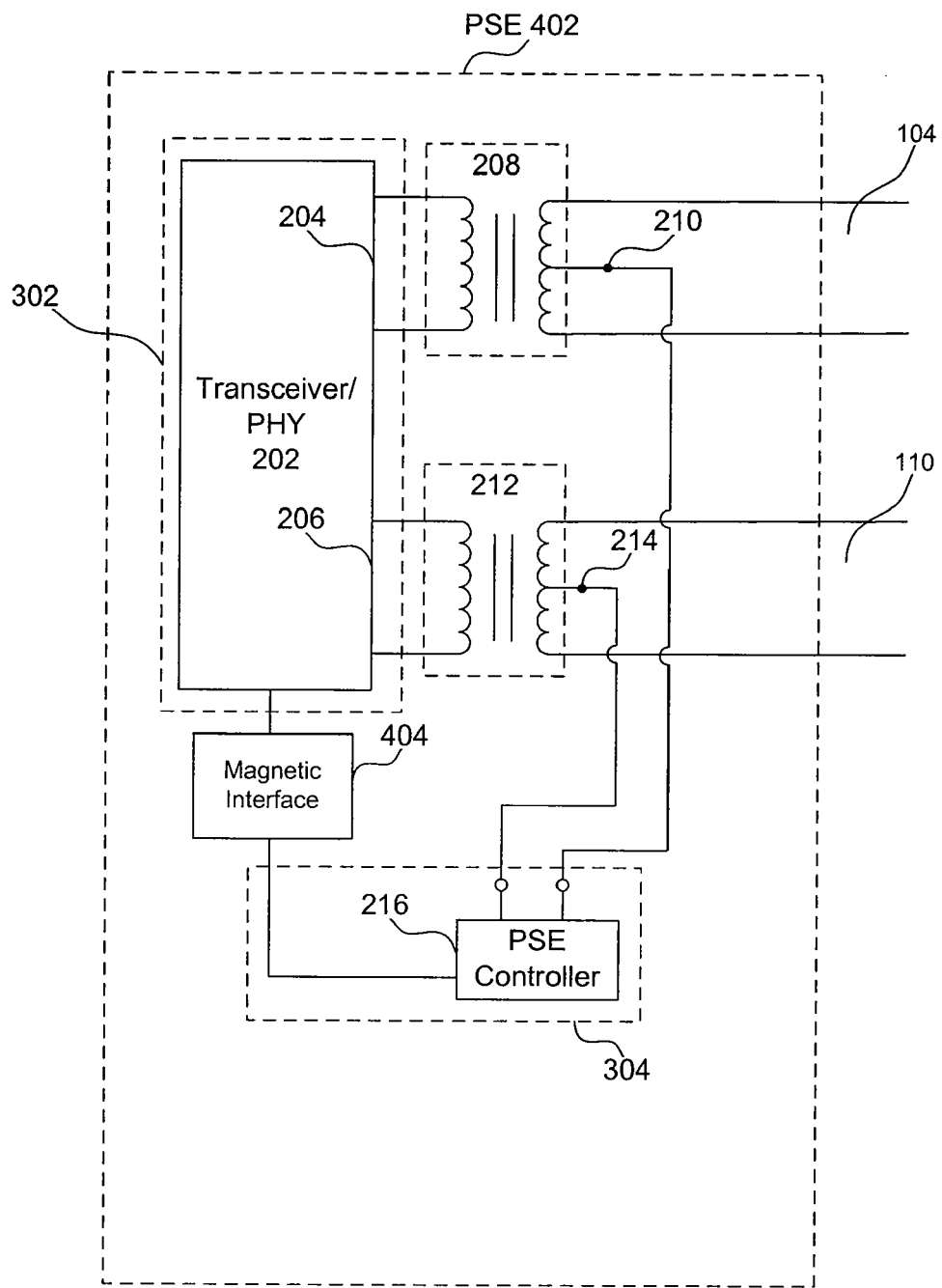
FIG. 4 illustrates an example PSE having a high speed isolation interface according to an embodiment of the present invention.

FIG. 4 illustrates an example embodiment 400 of a PSE 402 having a high speed isolation interface according to an embodiment of the present invention. As shown, PSE 402 includes a magnetic interface 404 that couples the isolated side 302 and the wire side 304 of the PSE. Magnetic interface 404 serves as both a data interface and an electrical isolation interface. As such, magnetic interface 404 provides electrical isolation between the isolated side 302 and the wire side 304 of the PSE as required by PoE standard requirements. Magnetic interface 404 may further provide noise elimination and voltage level conversion between the isolated side 302 and the wire side 304.

In an embodiment, magnetic interface 404 includes an isolation transformer, such as transformers 208 and 212, for example. In another embodiment, magnetic interface 404 includes two transformers, with each transformer used to transfer information in one direction between the isolated side 302 and the wire side 304 of the PSE. Alternatively, a single transformer with two pairs (i.e., single core with two pairs wound separately) can be used to enable full duplex communication between the isolated side 302 and the wire side 304 of the PSE.

Magnetic interface 404 is characterized by a large bandwidth (e.g., greater than 20 MHz), which enables high data rate transmission between the isolated side 302 and the wire side 304 of the PSE. For example, according to embodiments of the present invention, an Ethernet based serial communications interface can be enabled over magnetic interface 404. The Ethernet based serial interface can be implemented according to multiple data rate configurations, including 10BASE-T, 100BASE-TX, 1000BASE-T, 2.5GBASE-T, 5GBASE-T, 10GBASE-T, 40GBASE-T, or 100GBASE-T. Non-Ethernet based serial communications interfaces can also be enabled over magnetic interface 404, as further described below.

Figure 5:
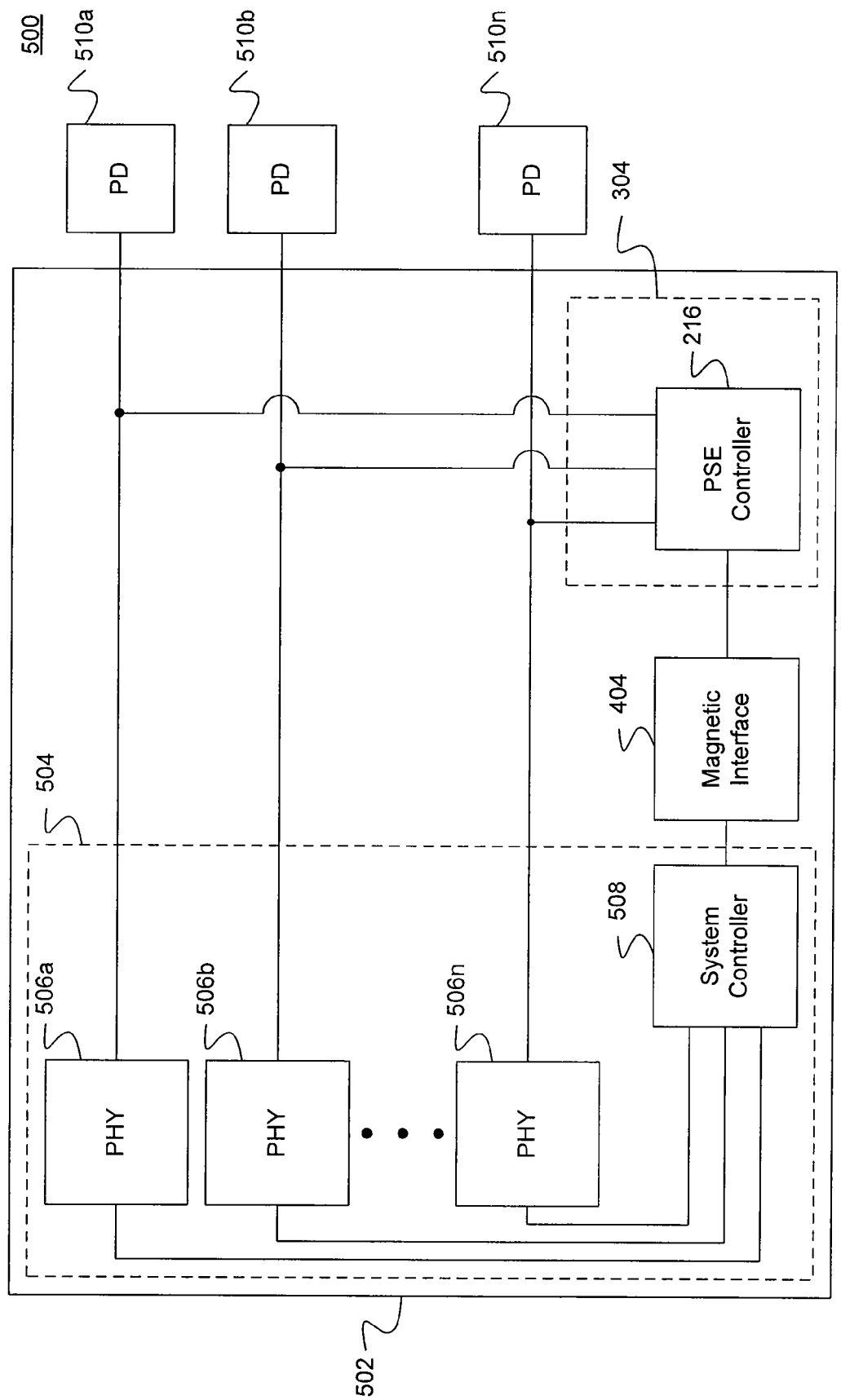
FIG. 5 illustrates an example multi-port PSE having a high speed isolation interface according to an embodiment of the present invention.

FIG. 5 illustrates an example 500 of a multi-port PSE 502 having a high speed isolation interface 404 according to an embodiment of the present invention. As shown, PSE 502 includes a plurality of PHY devices 506a-506n, a system controller 508, a magnetic interface 404, and a PSE controller 216. For ease of illustration, other components of PSE 502 are omitted, including the transformers (e.g., transformers 208 and 212 in FIG. 2) that couple PHY devices 506a-506n to the Ethernet conductor pairs (which are shown as single-ended conductors for simplicity).

According to example 500, each of PHY devices 506a-506n is coupled to a respective one of a plurality of PD devices 510a-510n. Further, each of PHY devices 506a-506n is coupled to system controller 508.

PHY devices 506a-506n and system controller 508 sit within the isolated side 504 of PSE 502. On the other hand, PSE controller 216 sits within the wire side 304 of PSE 502. Magnetic interface 404 couples the isolated side 504 and the wire side 304 of PSE 502, as shown in FIG. 5. Magnetic interface 404 is as described above in FIG. 4.

According to embodiments of the present invention, system controller 508 and PSE controller 216 act as interface controllers of the communications interface enabled by magnetic interface 404. In other embodiments, additional controllers are used which couple system controller 508 and PSE controller 216 to magnetic interface 404.

As described above, magnetic interface 404 may enable both Ethernet based and non-Ethernet based communications interfaces.

Figure 6:
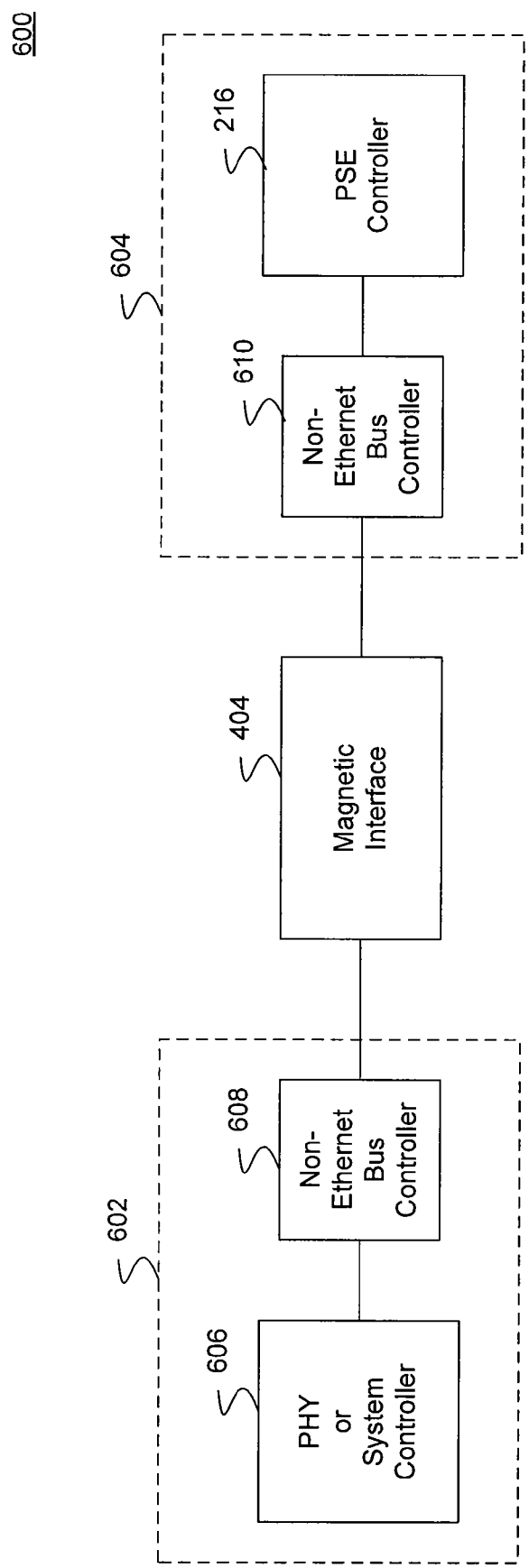
FIG. 6 illustrates an example non-Ethernet based high speed isolation interface according to an embodiment of the present invention.

FIG. 6 illustrates an example 600 of a non-Ethernet based high speed isolation interface according to an embodiment of the present invention. As shown in FIG. 6, magnetic interface 404 couples the isolated side 602 and the wire side 604 of a PSE system. The isolated side 602 includes a PHY (in the case of a single port PSE) or a System Controller 606 (in the case of a multi-port PSE) and a non-Ethernet Bus Controller 608. Similarly, the wire side 604 includes a non-Ethernet Bus Controller 610 and PSE controller 216. Non-Ethernet Bus Controllers 608 and 610 thus act on either side of the communications interface to transmit information forwarded respectively by PHY/System Controller 606 and PSE Controller 216. According to embodiments of the present invention, non-Ethernet Bus Controllers 608 and 610 may implement a simple, fast (non-Ethernet) signaling scheme.

According to an alternative embodiment, non-Ethernet Bus Controllers 608 and 610 are eliminated and PHY/System Controller 606 and PSE Controller 216 are adapted to communicate directly with each other through magnetic interface 404 according to the specified signaling scheme.

FIGS. 8A-8C illustrate example signaling schemes usable in a non-Ethernet based high speed isolation interface according to an embodiment of the present invention.

In FIG. 8A, frame 802 illustrates a control frame that can be used to send control information from a system controller (e.g., system controller 508) or a PHY device (e.g., PHY 202) to a PSE controller (e.g., PSE controller 216). Frame 802 can be adapted according to the number of ports in the PSE system. Frame 802 begins with a "start of sequence pattern" which identifies to the PSE controller the beginning of the control information in the frame. Subsequently, a control byte is dedicated to each port in the system. Frame 804 illustrates a status frame that can be used to send status information from the PSE controller to the system controller/PHY. Frame 804 is similar to frame 802, but with the control bytes replaced with status bytes, each dedicated to one port of the system.

FIG. 8B illustrates another variation of control and status frames according to embodiments of the present invention. As shown, frames 806 and 808 include bytes for only ports for which control information is being sent or from which status information is being received. This eliminates the need to dedicate a byte for each port in the system as in frames 802 and 804. Accordingly, frames 806 and 808 each begins with a "start of sequence pattern" followed by pairs of port number and associated control or status byte, for ports being sent control information or reporting status information.

FIG. 8C illustrates yet another variation of control and status frames according to embodiments of the present invention. Control frame 810 and status frame 812, like frames 806 and 808, also eliminate the need to dedicate a byte for each port in the system by specifying following the "start of sequence pattern" those ports for which control information is being sent or from which status information is being reported. In an embodiment, this is done using a "ports polled" or "reporting ports" field (which can be a few bytes long) which includes one bit for each port in the system to indicate if the port is being sent control information or reporting status information. Subsequently, control/status bytes for ports identified in the "ports polled" or "reporting ports" fields follow in the control/status frame.

As illustrated in FIGS. 8A-8C, the example signaling schemes described above are simple and can be effectively implemented over a magnetic interface, such as magnetic interface 404, for example. Further, when no bus controllers are used, the system controller/PHY and the PSE controller can be readily adapted to use these example signaling schemes.

Figure 7:
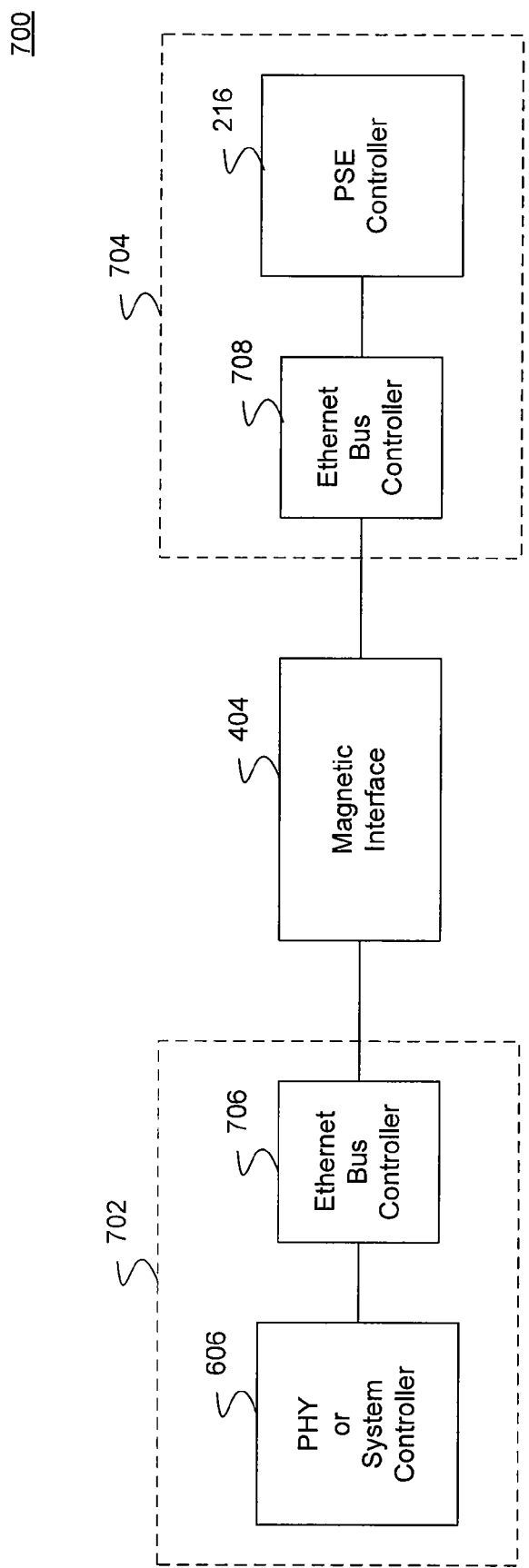
FIG. 7 illustrates an example Ethernet based high speed isolation interface according to an embodiment of the present invention.

Ethernet based communications interfaces may also be implemented using the high speed isolation interface of the present invention. In an embodiment, to enable an Ethernet based communications interface, the configuration of FIG. 6 is varied to use Ethernet Bus Controllers on either side of the communications interface, as illustrated in FIG. 7. According to embodiments of the present invention, Ethernet Bus Controllers 706 and 708 may be 10BASE-T, 100BASE-TX, 1000BASE-T, 2.5GBASE-T, 5GBASE-T, 10GBASE-T, 40GBASE-T, or 100GBASE-T Ethernet controllers, thereby enabling corresponding transmission data rates over magnetic interface 404. Alternatively, Ethernet Bus Controllers 706 and 708 are eliminated and PHY/System Controller 606 and PSE Controller 216 are adapted to communicate directly with each other through magnetic interface 404 according to an Ethernet signaling scheme.

Figure 9:
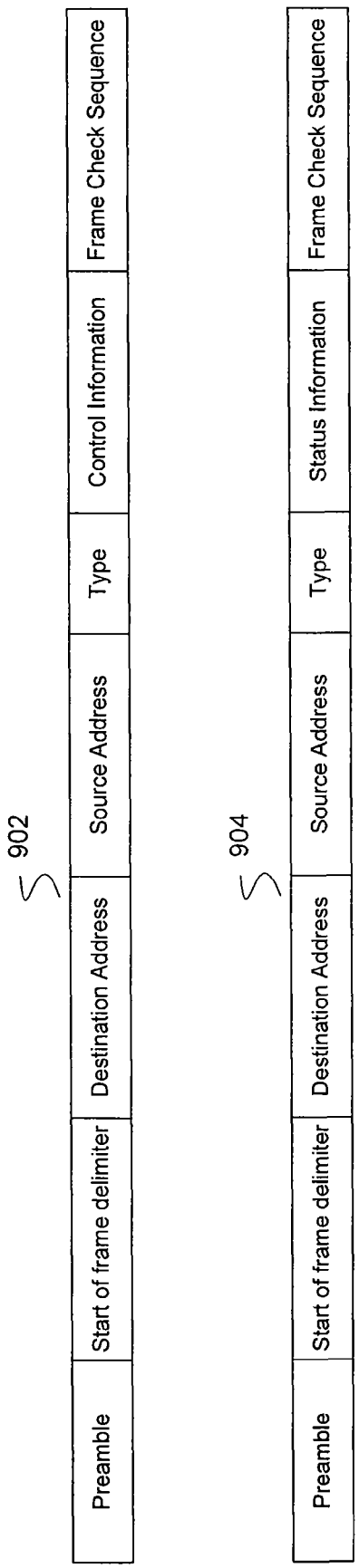
FIG. 9 illustrates an example signaling scheme usable in an Ethernet based high speed isolation interface according to an embodiment of the present invention.

When an Ethernet based communications interface is implemented, Ethernet signaling is used. FIG. 9 illustrates an example signaling scheme usable in an Ethernet based high speed isolation interface according to an embodiment of the present invention. The example signaling scheme adapts Ethernet frames to carry control information (e.g., frame 902) from the system controller/PHY to the PSE controller or status information (e.g., frame 904) from the PSE controller to the system controller/PHY. The control/status information can be as illustrated in FIGS. 8A-8C and is embedded within the payload field of the Ethernet frame, as shown in FIG. 9.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A Power over Ethernet (PoE) system, comprising:
   a power source equipment (PSE); and
   a powered device (PD);
   wherein said PSE and said PD are coupled via and Ethernet cable; and
   wherein said PSE comprises:
      one or more transceiver physical layer (transceiver/PHY) devices each having full duplex transmit and receive capability;
      a PSE controller that controls DC voltage supply from said PSE to said PD; and
      a magnetic interface that couples said one or more transceiver/PHY devices and said PSE controller, wherein said magnetic interface provides a target electrical isolation between said transceiver/PHY devices and said PSE controller and enables data communication between said transceiver/PHY devices and said PSE controller.

2. The PoE system of claim 1, wherein said magnetic interface enables a serial communications interface between said one or more transceiver/PHY devices and said PSE controller.

3. The PoE system of claim 2, wherein said magnetic interface enables an Ethernet based serial communications interface between said one or more transceiver/PHY devices and said PSE controller.

4. The PoE system of claim 3, wherein said Ethernet based serial communication interface is one of (a) 10BASE-T; (b) 100BASE-TX; (c) 1000BASE-T; (d) 2.5 GBASE-T; (e) 5 GBASE-T; (f) 10 GBASE-T; (g) 40 GBASE-T; and (h) 100 GBASE-T Ethernet interface.

5. The PoE system of claim 3, wherein control/status information communicated between said one or more transceiver/PHY devices and said PSE controller is embedded in Ethernet frames.

6. The PoE system of claim 2, wherein said magnetic interface enables a non-Ethernet based serial communications interface between said one or more transceiver/PHY devices and said PSE controller.

7. The PoE system of claim 1, wherein said PSE further comprises a system controller coupled between said one or more transceiver/PHY devices and said magnetic interface.

8. The PoE system of claim 1, wherein said PSE further comprises a first bus controller coupled between said one or more transceiver/PHY devices and said magnetic interface and a second bus controller coupled between said magnetic interface and said PSE controller.

9. The PoE system of claim 1, wherein a bandwidth of said magnetic interface is greater than 20 MHz.

10. The PoE system of claim 1, wherein said magnetic interface includes one or more transformers.

11. The PoE system of claim 1, wherein said PD comprises:
    a transceiver/PHY device;
    a PD controller; and
    a magnetic interface that couples said transceiver/PHY device and said PD controller, wherein said magnetic interface provides electrical isolation between said transceiver/PHY device and said PD controller.

12. The PoE system of claim 1, wherein said PoE system is one of (a) pre-standard PoE system; (b) 802.3af PoE system; and (c) 802.3 at PoE system.

13. A power source equipment (PSE) system, comprising:
    one or more transceiver physical layer (transceiver/PHY) devices each having full duplex transmit and receive capability;
    a PSE controller that controls DC voltage supply from said PSE to a powered device (PD); and
    a magnetic interface that couples said one or more transceiver/PHY devices and said PSE controller, wherein said magnetic interface provides a target electrical isolation between said transceiver/PHY devices and said PSE controller and enables data communication between said transceiver/PHY devices and said PSE controller.

14. The PSE system of claim 13, wherein said magnetic interface enables a serial communications interface between said one or more transceiver/PHY devices and said PSE controller.

15. The PSE system of claim 14, wherein said magnetic interface enables an Ethernet based serial communications interface between said one or more transceiver/PHY devices and said PSE controller.

16. The PSE system of claim 15, wherein said Ethernet based serial communication interface is one of (a) 10BASE-T; (b) 100BASE-TX; (c) 1000BASE-T; (d) 2.5 GBASE-T; (e) 5 GBASE-T; (f) 10 GBASE-T; (g) 40 GBASE-T; and (h) 100 GBASE-T Ethernet interface.

17. The PSE system of claim 15, wherein control/status information communicated between said one or more transceiver/PHY devices and said PSE controller is embedded in Ethernet frames.

18. The PSE system of claim 14, wherein said magnetic interface enables a non-Ethernet based serial communications interface between said one or more transceiver/PHY devices and said PSE controller.

19. The PSE system of claim 13, wherein said PSE further comprises a system controller coupled between said one or more transceiver/PHY devices and said magnetic interface.

20. The PSE system of claim 13, wherein said PSE further comprises a first bus controller coupled between said one or more transceiver/PHY devices and said magnetic interface and a second bus controller coupled between said magnetic interface and said PSE controller.

21. The PSE system of claim 13, wherein a bandwidth of said magnetic interface is greater than 20 MHz.

22. The PSE system of claim 13, wherein said magnetic interface includes one or more transformers.

23. The PSE system of claim 13, wherein said PSE system is one of (a) pre-standard PSE system; (b) 802.3af PSE system; and (c) 802.3 at PSE system.

* * * * *

UNITED STATES PATENT AND TRADEMARK OFFICE
CERTIFICATE OF CORRECTION

PATENT NO. : 8,279,883 B2  
APPLICATION NO. : 12/168577  
DATED : October 2, 2012  
INVENTOR(S) : Diab et al.

Page 1 of 1

It is certified that error appears in the above-identified patent and that said Letters Patent is hereby corrected as shown below:

Column 9, Line 26, "and" should be replaced with --an--.

Column 9, Line 52, "10 GBASE-T; (g) 40 GBASE-T" should be replaced with --10GBASE-T; (g) 40GBASE-T--.

Column 10, Line 41, "10 GBASE-T; (g) 40 GBASE-T" should be replaced with --10GBASE-T; (g) 40GBASE-T--.

Signed and Sealed this  
Thirteenth Day of November, 2012

David J. Kappos  
*Director of the United States Patent and Trademark Office*